May 22, 1951  P. M. ARNOLD  2,553,538
CONVERSION OF ORTHO TERTIARY ALKYL PHENOLS
TO PARA TERTIARY ALKYL PHENOLS
Filed Aug. 5, 1947
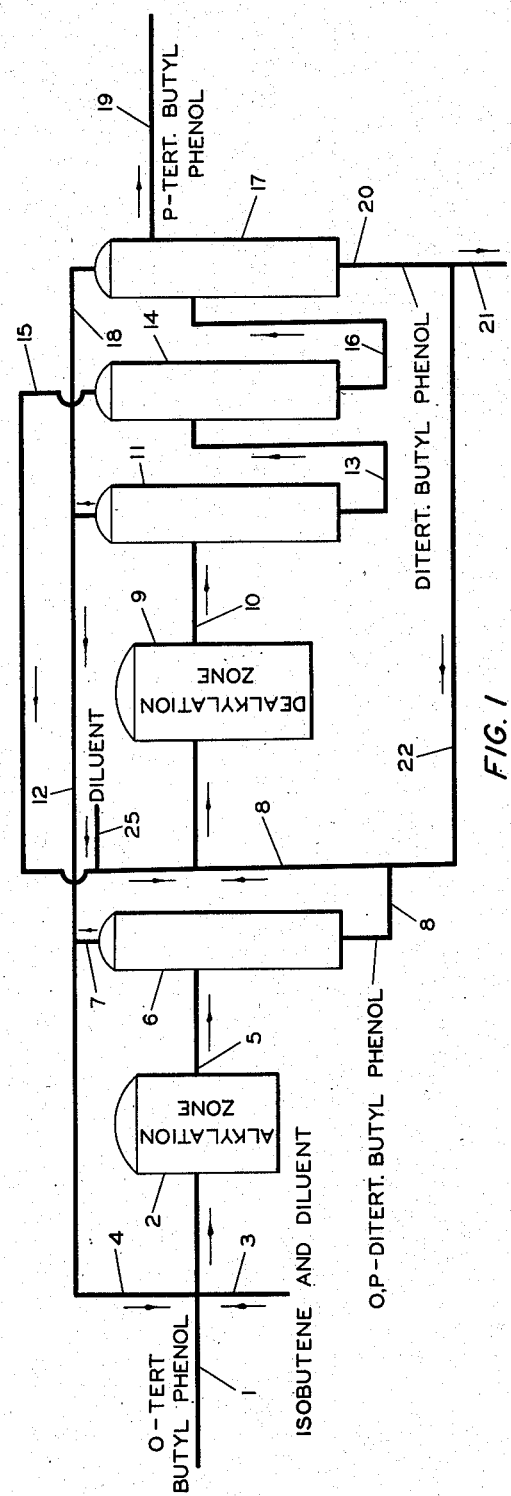
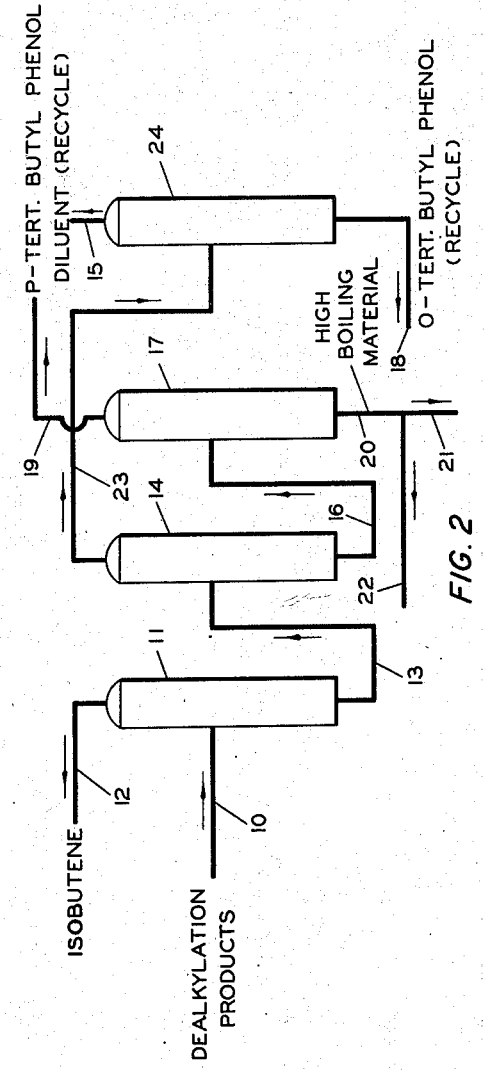
INVENTOR.
P. M. ARNOLD
BY *Hudson + Young*
ATTORNEYS Patented May 22, 1951

2,553,538

UNITED STATES PATENT OFFICE 2,553,538

CONVERSION OF ORTHO TERTIARY ALKYL PHENOLS TO PARA TERTIARY ALKYL PHENOLS

Philip M. Arnold, Bartlesville, Okla., assignor to Philips Petroleum Company, a corporation of Delaware Application August 5, 1947, Serial No. 766,437

14 Claims. (Cl. 260—624)

This invention relates to the isomerization of ortho tertiary alkyl phenols to the corresponding para tertiary alkyl phenols. In one preferred embodiment the invention relates to such isomerization as effected on the tertiary butyl compounds. The invention provides an improved chemical method for converting the ortho to the para compounds.

The various tertiary alkyl phenols are important chemicals commercially. Certain of these compounds are applied per se to different uses while others are more important as chemical intermediates. In many instances the para compounds are found to be more valuable than the ortho compounds. Accordingly, various processes have been proposed for isomerizing ortho tertiary alkyl phenols to para tertiary alkyl phenols. These processes have suffered from various disadvantages, among which may be included substantial losses of material in the form of high-boiling residue. This result may be explained perhaps by the long digesting time normally required to effect the attainment of an equilibrium isomerization.

Para tertiary butyl phenol is of particular interest at the present time and is prepared commercially by alkylation of phenol with isobutylene. Alternatively, it may be prepared by alkylation of phenol with tertiary butyl alcohol, or with tertiary butyl chloride. Numerous catalysts may be employed for the alkylation reaction, and ordinarily the catalyst is of an acidic nature. As specific examples may be mentioned sulfuric acid, aluminum chloride, various other Friedel-Crafts type metal halides, hydrofluoric acid, hydrochloric acid, phosphoric acid, toluene sulfonic acid, and the like. The alkylation may also be accomplished in the presence of natural clays, preferably those which have been acid treated. Recently the use of a synthetic silica gel catalyst activated with minor proportions of alumina or other metal oxide has been described my Schulze and Mahan in patent application Serial No. 653,590 filed March 11, 1946. Regardless of the catalyst used and the reaction conditions employed, substantial amounts of the ortho isomer are formed, with consequent reduction in yield of the desired para isomer.

It is an object of this invention to isomerize ortho tertiary alkyl phenol to para tertiary alkyl phenol.

It is another object of the invention to accomplish such an isomerization with extremely high ultimate yields of the desired para isomer.

A further object is to convert ortho tertiary butyl phenol by means of a series of chemical reactions into para tertiary butyl phenol.

Yet another object is to convert ortho tertiary amyl phenol into para tertiary amyl phenol.

Further objects and advantages of the invention will be apparent to one skilled in the art from the accompanying disclosure and discussion.

In accordance with a preferred embodiment of my invention, ortho tertiary butyl phenol from any source is first subjected to an alkylation reaction with isobutylene in order to form ditertiary butyl phenol. While isobutylene is the preferred alkylating reactant, t-butyl chloride or t-butyl alcohol may be employed if desired in conjunction with suitable catalysts.

The resulting dialkylated compound is almost wholly 2,4-ditertiary butyl phenol. The resulting alkylation mixture is subjected to suitable separation steps to recover the di-butyl compound as an intermediate product.

The thus-recovered di-tertiary butyl phenol is next subjected to a dealkylation reaction, in the absence of added phenol, and over a suitable catalyst. The preferred catalyst is described in detail hereinbelow. The mono-tertiary butyl phenol produced as a result of the dealkylation reaction is predominantly the para isomer. Accordingly, by the series of steps outlined, I am able to obtain a simple and effective conversion of the ortho isomer to the para isomer. Any ortho tertiary butyl phenol formed in the dealkylation is readily recovered and recycled to the first alkylation step, so that substantially all of this compound introduced into the process is recovered as the para compound. Of course, isobutylene is a product of the dealkylation reaction, and this material is recovered and recycled to the alkylation reaction. In this manner an internally complete cyclic process is provided, and when the various steps are carried out under the preferred reaction conditions and in the presence of the preferred catalysts of the invention, very little makeup isobutylene reactant is required, and a large production of para tertiary butyl phenol is realized. Likewise, the loss of ortho tertiary butyl phenol charged to the process, in the form of heavy alkyl phenols and tars, is extremely small as will be illustrated below. The invention will be described with particular reference to the conversion of ortho tertiary butyl phenol to the corresponding para tertiary butyl phenol. However, it will be understood by those skilled in the art that similar procedures are employed with suitable modification where necessary, when other tertiary alkyl phenols are to be treated and produced.

The accompanying drawing illustrates diagrammatically by means of a schematic representation one arrangement of apparatus elements and flow of materials therethrough suitable for practicing a specific and preferred embodiment of my invention. In view of the diagrammatic nature of the drawing it will be appreciated that numerous elements of auxiliary equipment, such as pumps, valves, heat exchangers, control means, condensers, furnaces, and the like, as well as specific details of construction of the various elements illustrated, are not shown in the drawing for the sake of simplicity. Inasmuch as such items are well understood by those skilled in the art, they need not be described in further detail here. It will also be appreciated, of course, that various alternative arrangements may be employed without departing from the broad scope of the invention. Figure 1 shows one arrangement of apparatus and flow of materials, while Figure 2 illustrates an alternative arrangement for the latter part of the process.

In the drawing, a feed stream comprising ortho tertiary butyl phenol from any source (not shown) is introduced via line 1 into alkylation zone 2. Isobutylene recycled from a subsequent separation step, plus an inert hydrocarbon diluent such as n-hexane, is added to the feed stream from recycle line 4. Make-up isobutylene and/or diluent may be introduced as needed via line 3. The effluents from alkylation zone 2 pass via line 5 to fractionator 6, in which dtertiary butyl phenols and heavier products are separated from unchanged o-tertiary butyl phenol, n-hexane, and any unreacted isobutylene. The latter materials are taken overhead from fractionator 6 via line 7, and returned to reactor 2 via line 4, while the dialkyl phenols and higher boiling products pass via line 8 to dealkylation zone 9. A second diluent stream, which may be n-hexane or some other inert hydrocarbon, is recycled to dealkylation zone 9 from fractionator 14 via line 15, make-up diluent being supplied from line 25. The products of the dealkylation reaction are carried by line 10 to fractionator 11, from which isobutylene is taken as an overhead product for recycling to reactor 1 via lines 12 and 4, and higher boiling products are passed via line 13 to fractionator 14. The overhead product from fractionator 14, i. e., the hydrocarbon diluent, is recycled to reactor 9 via line 15, while the kettle product of unit 14 is carried via line 15 to fractionator 17. Here is a separation is made between o-tertiary butyl phenol, p-tertiary butyl phenol, and the dialkyl phenols and heavier products. The ortho isomer is passed to reactor 2 via lines 18, 12 and 4, and the para compound is removed as the principal product of the process via line 19. The dialkyl phenols and heavier products may be removed from the system via lines 20 and 21, or may be partly or wholly recycled to dealkylation reactor 9. Vacuum fractionation may be employed advantageously in fractionator 17, because of the relatively high boiling points of the alkyl phenols, or a third inert hydrocarbon diluent stream may be employed to facilitate this separation.

A modification of the separation steps which may be desirable in certain instances is shown in Figure 2. The effluents from dealkylation reactor 9 are passed via line 10 to fractionator 11 for recovery of isobutylene as an overhead product through line 12. The remaining material flows through line 13 into fractionator 14. Fractionator 14 is operated so as to yield an overhead product comprising the inert diluent and o-tertiary butyl phenol, and a kettle product comprising p-tertiary butyl phenol and higher boiling products. The overhead product removed via line 23 is then fractionated in column 24 to separate the diluent from the o-tertiary butyl phenol, the former being recycled via line 15 to dealkylation reactor 9 and the latter being recycled via line 18 to alkylation reactor 2. The kettle product of column 14 is removed via line 16 and then fractionated in unit 17 to produce the p-tertiary butyl phenol product overhead through line 19 and the dialkyl phenols and higher boiling materials as kettle product which is removed through line 20 either for recycle via line 22 to dealkylation reactor 9 or for removal from the system through line 21.

The alkylation reaction in unit 2 is effected in the presence of a suitable catalyst, and reaction conditions do not differ greatly from those used in the heretofore-known alkylation of phenol with an olefin to produce a mono-alkyl phenol. In such an alkylation, there is usually formed a small amount of the dialkyl phenol, but it has not been suggested before, so far as I am aware, to subject the mono-alkyl phenol to a further alkylation in order to form the dialkyl phenol deliberately.

Several types of catalyst may be employed to concert o-t-butyl phenol into 2,4-ditertiary butyl phenol by reaction with isobutylene. Aluminum chloride and other metal halide catalysts of the Friedel-Crafts type are suitable, but tend to produce undesirably large amounts of by-products such as olefin polymers and polyalkyl phenols heavier than the di-alkyl derivative, with consequent low ultimate yield. The situation is similar with the strong acid catalysts, such as sulfuric acid, toluene sulfonic acid, and the like. Anhydrous hydrogen fluoride is somewhat more selective.

Another group of catalysts comprises those known as "contact materials," among which are included bleaching earths, clays, various other naturally occuring silicates, especially when activated by partial drying and/or with acids. Also, activated alumina, bauxite, and the like have some utility.

It is preferred, however, in the practice of my invention, to alkylate the ortho tertiary alkyl phenol with an isoolefin in the presence of a solid adsorbent catalyst comprising a synthetic precipitated silica gel promoted by impregnation with relatively minor proportions of certain metal oxides such as aluminum oxide, titanium oxide, zirconium oxide, and the like. When these catalysts are employed, reaction conditions may be so selected that the reaction products are almost exclusively the dialkyl phenols, with very little higher boiling material or aralkyl ethers being formed.

The solid adsorbent catalysts which are a feature of the present process are most accurately described as dried gels and are characterized by their chemical composition, their physical properties and by the specific methods of preparation, said methods being responsible in large part for their chemical activity. Although these catalysts are broadly referred to as metallic oxide promoted silica gel compositions, it is to be understood that they have distinctly different catalytic properties from the naturally occurring minerals which contain some of the same components. For example, the acid treated bleaching earths, clays, kaolins and similar naturally occurring silicates are quite different in composition from the preferred synthetic catalysts.

The catalysts employed in this invention are prepared by forming a hydrous silica gel or jelly usually from an alkali metal silicate and an acid, washing soluble material from the gel, treating or activating said gel with an aqueous solution of a suitable metal salt, and subsequently washing and drying the treated material. In this manner a part of the metal, presumably in the form of a hydrous oxide or loose hydroxide compound formed by hydrolysis, is selectively adsorbed by the hydrous silica and is not removed by subsequent washing. The most frequently used catalyst of this type is a silica-alumina catalyst prepared by treating a wet or partially dried hydrous silica gel with an aluminum salt solution, such as a solution of aluminum chloride or sulfate, and finally washing and drying the treated material. Other catalysts of a similar nature may be prepared by using, instead of an aluminum salt, a hydrolyzable salt of a metal selected from group III-B or from group IV-A of the periodic system. More particularly, salts of indium and thallium in addition to aluminum in group III-B and salts of titanium, zirconium and thorium in group IV-A are employed. Whether prepared by this method or by some modification thereof, the catalyst will contain a major portion of silica and a minor portion of metal oxide. This minor portion of metal oxide, such as alumina, will generally not be in excess of 10 per cent by weight and will usually range from about 0.1 to 2.0 per cent by weight.

Reaction conditions for the alkylation of the ortho tertiary alkyl phenol with the tertiary olefin will vary somewhat, depending upon the catalyst employed and the reactivity of the particular olefin. With the silica alumina catalyst described above the initial temperature may be about 200° F., and as the catalyst activity declines the temperature is usually gradually increased up to 300° F. or higher. With less active clay-type catalysts somewhat higher temperatures are required, usually at least 250° F. On the other hand, with aluminum chloride or sulfuric acid lower temperatures of about atmospheric or somewhat above atmospheric are usually adequate and in fact necessary to prevent excessive polymerization of the olefin and other side reactions. Moderately elevated pressures are preferred and it is usually desirable that the pressure be sufficiently high to maintain liquid phase or mixed phase conditions at the particular reaction temperature. A molar excess of the ortho tertiary alkyl phenol over the tertiary olefin reactant is used as a further means of obtaining high ultimate yields through the avoidance of olefin polymerization. An inert hydrocarbon diluent is also advantageous, and this may be an aliphatic or alicyclic hydrocarbon or hydrocarbons. Flow rates of total reactant mixture may range from 1 to 10 liquid volumes per volume of catalyst per hour, the exact figure depending upon the catalyst, temperature, and reactants employed.

For the dealkylation reaction any suitable catalyst may be employed by which the 2,4-ditertiary alkyl phenol is converted into a mixture of the desired para tertiary alkyl phenol and the corresponding ortho compound. In general, any of the catalysts mentioned above as suitable for the alkylation may also be employed in the dealkylation reaction. Where acid type catalysts, including the metal halides are employed, it is preferable that some means be provided for the rapid separation of resulting iso-olefin from the reaction mass, such as by sweeping with an inert gas. This is somewhat less important where contact catalysts are used. It is preferred in the practice of this invention to effect the dealkylation in the presence of a synthetic silica alumina type catalyst prepared in the manner described above.

Dealkylation temperatures are generally higher than alkylation temperatures, and in the case of silica alumina catalysts will be at least about 300° F. and may range as high as 400 to 500° F. With less active surface catalysts higher temperatures are required. With acid type catalysts, temperatures of 200–600° F. are suitable. Low pressure is required in the dealkylation reaction for optimum results. While sub-atmospheric pressures are desirable, they are not necessary and it is ordinarily preferred from the standpoint of operating convenience to use substantially atmospheric or slightly superatmospheric pressures, such as 10 to 20 p. s. i. g. When a paraffinic or naphthenic diluent is used in the dealkylation reaction, the proportion of same is ordinarily less than that used in the alkylation step. A suitable flow rate may be selected from a wide range of operable values in accordance with the temperature and catalyst used in any given instance.

The following specific example is given to illustrate one mode and set of conditions suitable for carrying out the process of my invention. It will, of course, be appreciated that variations may be made within the broader scope of the invention.

*Example*

A mixture of o-tertiary butyl phenol, isobutylene, and n-hexane, in a mol ratio of 3:1:4, was charged to a steel reactor containing fresh silica-alumina catalyst at a temperature of 200° F. The catalyst had been prepared by adsorption of alumina on a hydrous silica gel from an aqueous solution of aluminum sulfate. A flow rate of approximately 5 liquid volumes of feed per volume of catalyst per hour was maintained, with a pressure of 500 p. s. i. g. in the reaction zone. The effluents from the reactor were separated by fractional distillation into a recycle stream containing the diluent, a small amount of unreacted isobutylene, and the unreacted o-tertiary butyl phenol, and a higher boiling product stream consisting predominantly of 2,4-ditertiary butyl phenol with a small amount of tritertiary butyl phenol. The latter stream was then mixed with an equal volume of n-hexane diluent and passed to a dealkylation reactor containing silica-alumina catalyst and maintained at 300° F. A pressure of 10 p. s. i. g. was employed, and the flow rate was 2 liquid volumes of feed per volume of catalyst per hour. Under these conditions the desired dealkylation of di- and tritertiary butyl phenols to mono tertiary butyl phenols occurred to the extent of about 95 per cent per pass, with the para isomer predominating in the products. The dealkylation effluents were separated by a series of fractional distillation steps into (1) isobutylene, which was recycled to the alkylation zone, (2) n-hexane, which was returned to the dealkylation zone, (3) o-tertiary butyl phenol, which was recycled to the alkylation reactor, (4) p-tertiary butyl phenol, the desired product, and (5) unchanged ditertiary butyl phenols and heavier products which were largely returned to the dealkylation reactor. Less than 1 per cent of the o-tertiary butyl phenol charged to the process is lost in the form of heavy alkyl phenols and tars.

I claim:

1. A process for converting an ortho tertiary alkyl phenol into the corresponding para tertiary alkyl phenol isomer, which comprises reacting in a first reaction step the ortho tertiary alkyl phenol as the sole phenolic reactant present with a compound selected from the group consisting of olefins, alkyl halides, and alcohols capable of yielding a tertiary alkyl radical which is the same as the tertiary alkyl radical of the said ortho compound in the presence of a catalyst for nuclear alkylation of phenols to form a 2,4-ditertiary alkyl phenol, subjecting said dialkyl phenol in a second reaction step to dealkylation in the absence of added phenol and in the presence of a phenol dealkylation catalyst to form para tertiary alkyl phenol and ortho tertiary alkyl phenol, recycling the latter to said first reaction step, and recovering said para tertiary alkyl phenol from effluents of said second reaction step as the net product of the process.

2. A method according to claim 1 wherein ortho tertiary amyl phenol is converted to para tertiary amyl phenol.

3. A method according to claim 1, wherein ortho tertiary butyl phenol is converted to para tertiary butyl phenol.

4. A method according to claim 3 wherein said ortho tertiary butyl phenol is alkylated with isobutylene to form 2,4-ditertiary butyl phenol.

5. A method according to claim 4 wherein said ortho tertiary butyl phenol is alkylated with isobutylene in the presence of a synthetic silica-alumina gel-type catalyst at 200 to 300° F.

6. A method according to claim 5 wherein said alkylation is effected under sufficient pressure to insure liquid phase operation, and wherein the resulting 2,4-ditertiary butyl phenol is dealkylated in the presence of a synthetic silica-alumina gel-type catalyst at a higher temperature of 300 to 500° F. and at a lower pressure than used in said alkylation.

7. A method according to claim 1 wherein said 2,4-ditertiary alkyl phenol is dealkylated in the presence of a synthetic silica-alumina gel-type catalyst at 300 to 500° F. and at a pressure not exceeding 20 pounds per square inch gauge to form a mixture of p-t-alkyl phenol and o-t-alkyl phenol, the latter is recycled to said first reaction step, and the former is recovered as the net product of the process.

8. A method according to claim 1 wherein said alkylating compound is a tertiary olefin.

9. A method of converting an ortho tertiary alkyl phenol into the corresponding para tertiary alkyl phenol isomer in high ultimate yields which comprises alkylating an ortho tertiary alkyl phenol as the sole phenolic reactant present with a tertiary olefin having the same number of carbon atoms as the alkyl group of the phenol, in the presence of an active phenol alkylating catalyst and an inert liquid hydrocarbon diluent while maintaining a molar excess of the ortho tertiary alkyl phenol over the olefin, separating the resulting reaction mixture into fractions including unreacted ortho tertiary alkyl phenol, diluent, and 2,4-ditertiary alkyl phenol product, recycling said unreacted ortho tertiary alkyl phenol and diluent to the alkylation reaction, dealkylating said 2,4-ditertiary alkyl phenol in the absence of phenol and in the presence of an inert hydrocarbon diluent and an active phenol dealkylation catalyst at a low pressure, separating the resulting reaction mixture into fractions including diluent, tertiary olefin, ortho tertiary alkyl phenol, unreacted ditertiary alkyl phenol, and the desired para tertiary alkyl phenol product, and recycling said diluent and unreacted ditertiary alkyl phenol to said dealkylation reaction and said tertiary olefin and ortho tertiary alkyl phenol to said alkylation reaction.

10. A method according to claim 9 wherein ortho tertiary butyl phenol is converted into para tertiary butyl phenol.

11. A method according to claim 9 wherein ortho tertiary amyl phenol is converted into para tertiary amyl phenol.

12. A method according to claim 9 wherein the alkylation reaction mixture is separated by fractional distillation into one fraction comprising unreacted ortho tertiary alkyl phenol and diluent and another higher boiling fraction comprising a 2,4-ditertiary alkyl phenol.

13. A method according to claim 9 wherein the dealkylation reaction mixture is separated by fractional distillation into a fraction comprising tertiary olefin, another fraction comprising diluent, another fraction comprising ortho tertiary alkyl phenol, another fraction comprising para tertiary alkyl phenol product, and another fraction comprising unreacted ditertiary alkyl phenol plus heavier products, each of said fractions being higher boiling than the preceding named fraction, and wherein a portion of said last-named fraction is recycled to the dealkylation reaction while another portion is removed from the system.

14. A method according to claim 9 wherein the dealkylation reaction mixture is separated by fractional distillation first into a low-boiling fraction comprising tertiary olefin, and a higher-boiling fraction, said higher boiling fraction is separated into a low-boiling fraction comprising diluent and ortho tertiary alkyl phenol and a higher-boiling fraction comprising para tertiary alkyl phenol product and heavier alkyl phenols, and each of said two latter fractions is separated into its constituents.

PHILIP M. ARNOLD.

REFERENCES CITED

The following references are of record in the file of this patent:

UNITED STATES PATENTS

| Number | Name | Date |
| --- | --- | --- |
| 1,972,599 | Perkins et al. | Sept. 4, 1934 |
| 2,051,473 | Evans et al. | Aug. 18, 1936 |
| 2,115,884 | Schollkopf | May 3, 1938 |
| 2,248,828 | Stevens et al. | July 8, 1941 |
| 2,248,829 | Stevens et al. | July 8, 1941 |
| 2,297,588 | Stevens et al. | Sept. 29, 1942 |
| 2,298,660 | Stevens et al. | Oct. 13, 1942 |
| 2,360,358 | Mattox | Oct. 17, 1944 |
| 2,372,320 | Frey | Mar. 27, 1945 |
| 2,410,111 | Thomas et al. | Oct. 29, 1946 |
| 2,436,698 | Oblad | Feb. 24, 1948 |